United States Patent  [15] 3,668,773
Achterberg  [45] June 13, 1972

[54] AUTOMATIC INSERT ASSEMBLY SYSTEM EMPLOYING ROTARY TRANSFER OF THE WORKPIECE

[72] Inventor: Raymond C. Achterberg, Janesville, Wis.
[73] Assignee: Giddings & Lewis, Inc., Fond du Lac, Wis.
[22] Filed: Sept. 17, 1970
[21] Appl. No.: 73,068

[52] U.S. Cl. ..................... 29/429, 29/156.8 FC, 29/208 D, 29/211 D
[51] Int. Cl. ................. B23p 19/00, B23p 15/02, B23q 7/10
[58] Field of Search ............ 29/429, 208 D, 211 D, 156.8 FC, 29/211, 208 R

[56] References Cited

UNITED STATES PATENTS 2,142,109  1/1939  Burke ........................................ 29/430
3,522,645  8/1970  Kennicott ........................... 29/211 D Primary Examiner—Thomas H. Eager
Attorney—Wolfe, Hubbard, Leydig, Voit & Osann

[57] ABSTRACT

An assembly machine and method are provided for automatically inserting and fixing blade-like inserts in a torque converter turbine drum or like article. The assembly mechanism includes automatic apparatus for accomplishing the requisite assembly motions, including securely grasping a turbine drum or housing at a load-unload station, moving the drum or housing to a work station, stripping a blade-like insert from a feeding magazine, rolling the stripped insert into the drum or housing, angularly indexing the drum or housing to a successive position so as to receive the next blade-like insert, counting the number of angular indexing steps imparted to the drum, and returning the drum or housing with its assembled blade-like inserts to the load-unload station when the requisite number of blades have been inserted.

31 Claims, 26 Drawing Figures

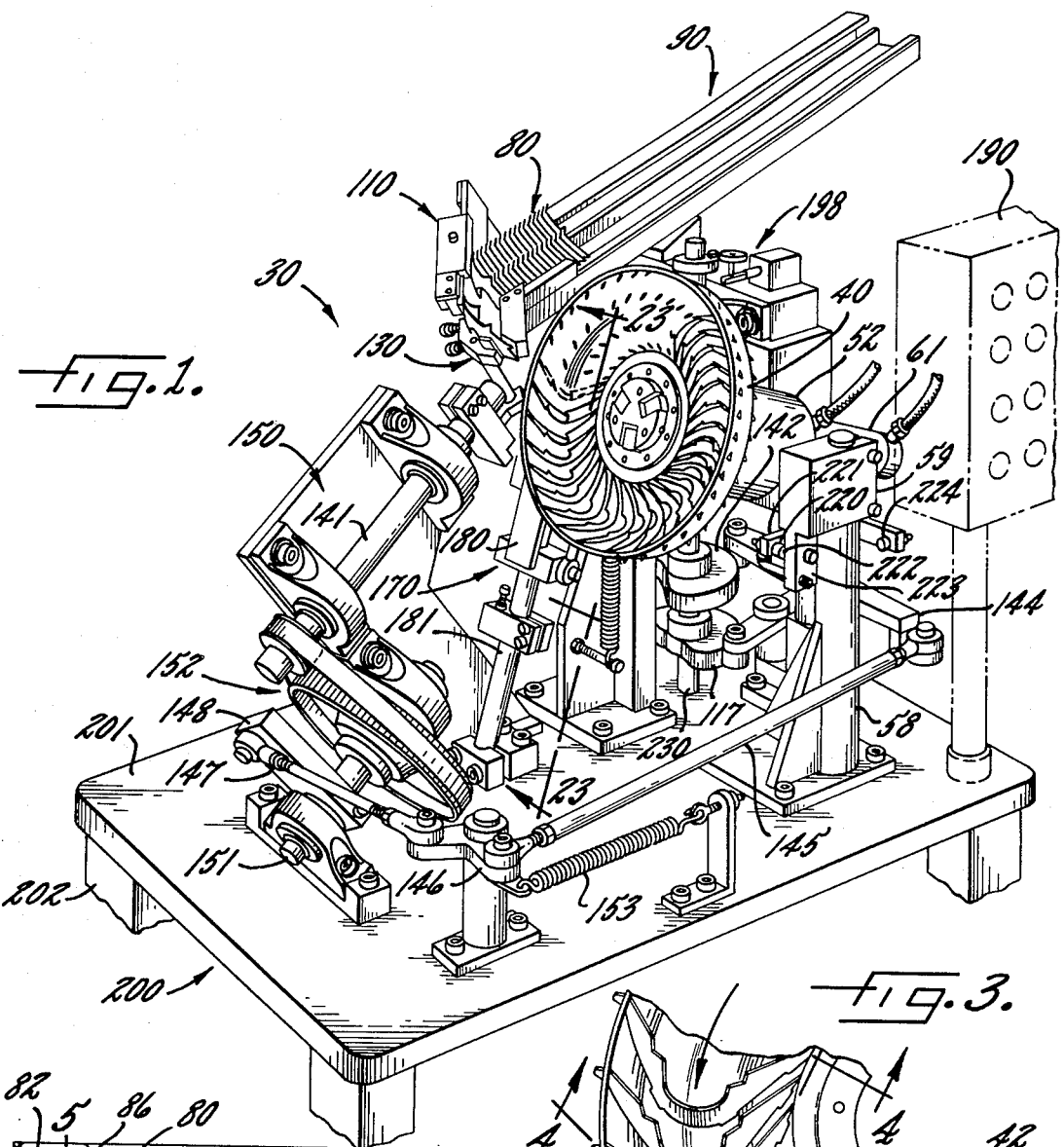
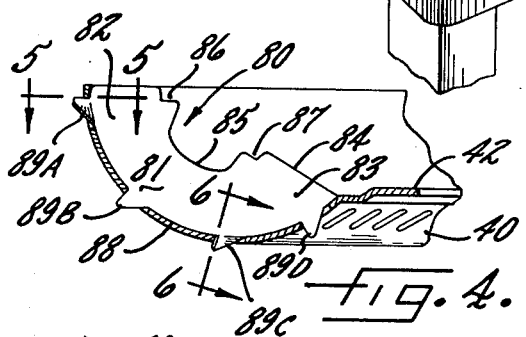
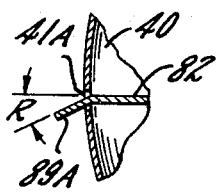
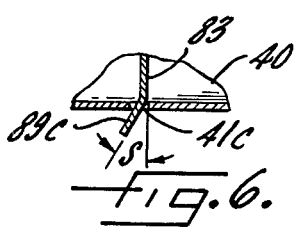

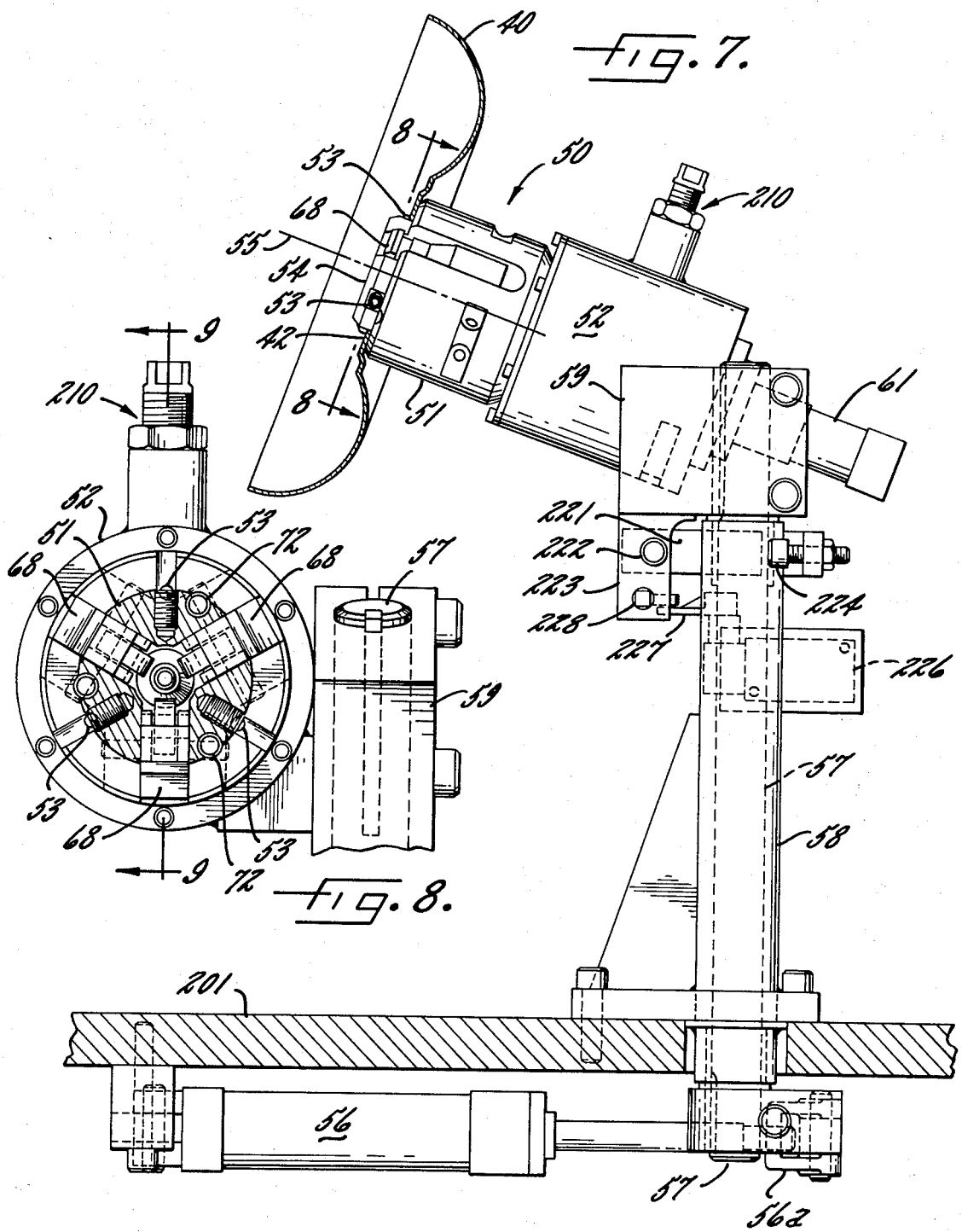

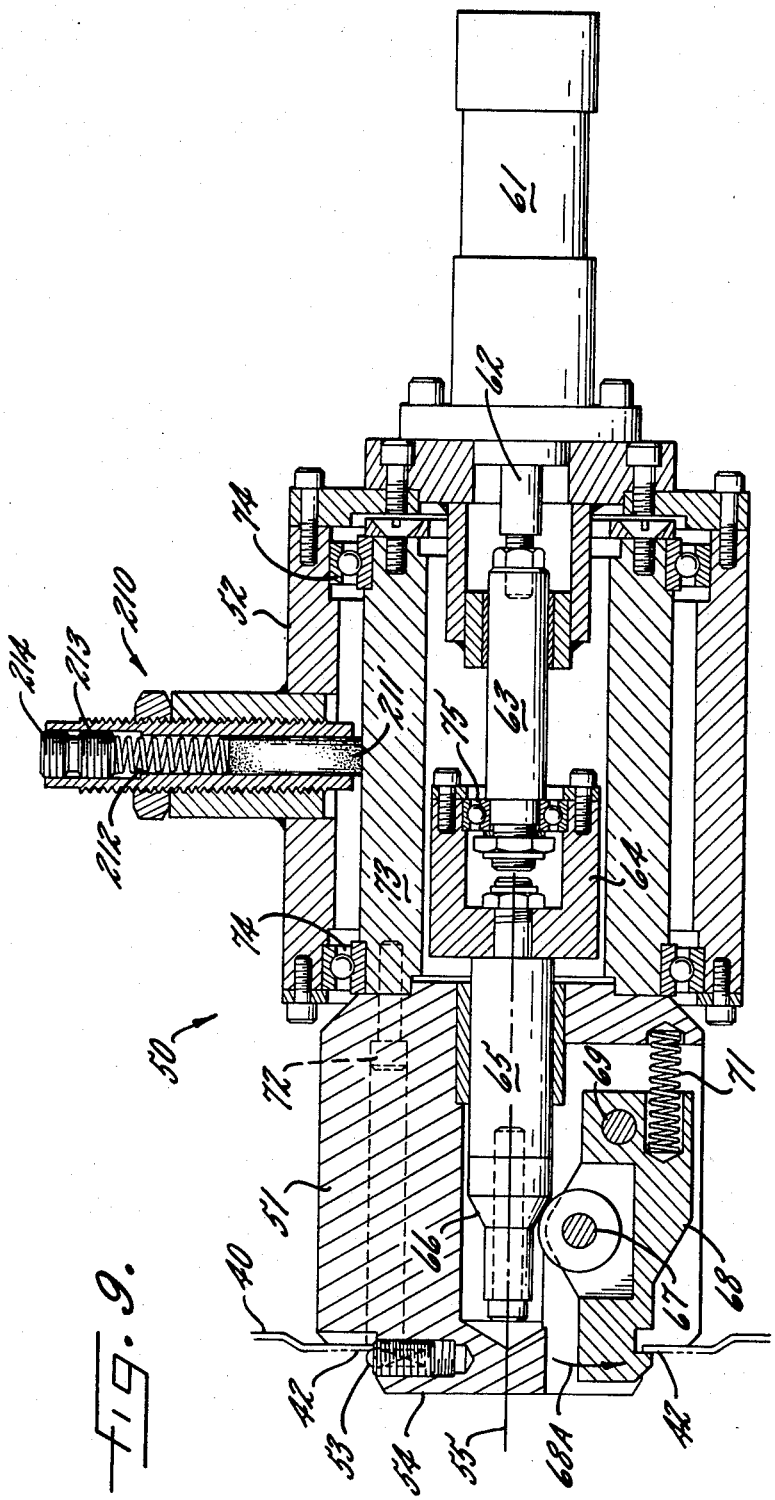

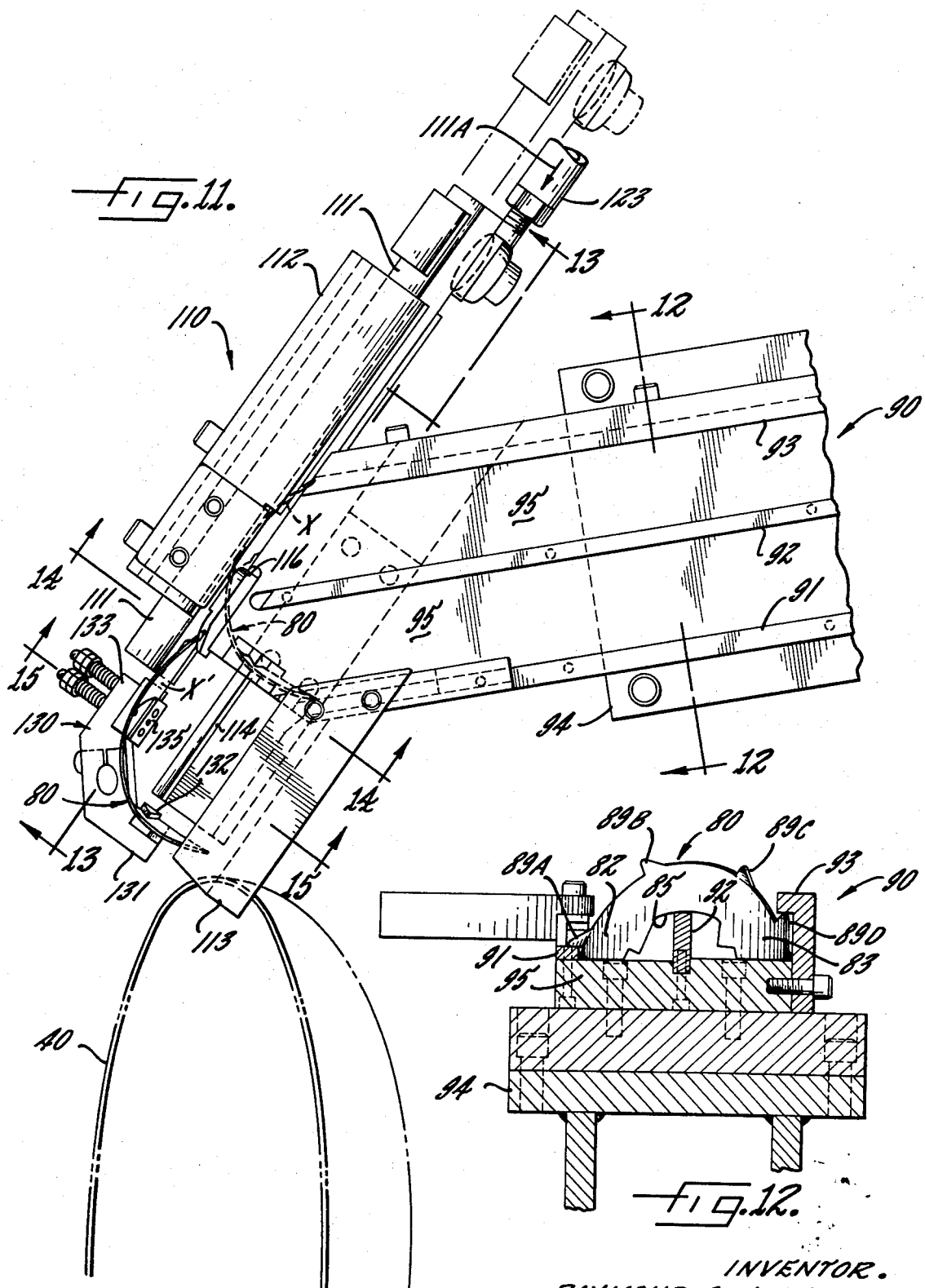

INVENTOR.
RAYMOND C. ACHTERBERG
BY
Wolfe, Hubbard, Leydig, Voit & Osann
ATTORNEYS.

INVENTOR.
RAYMOND C. ACHTERBERG
BY
Wolfe, Hubbard, Leydig, Voit & Osann
ATTORNEYS.

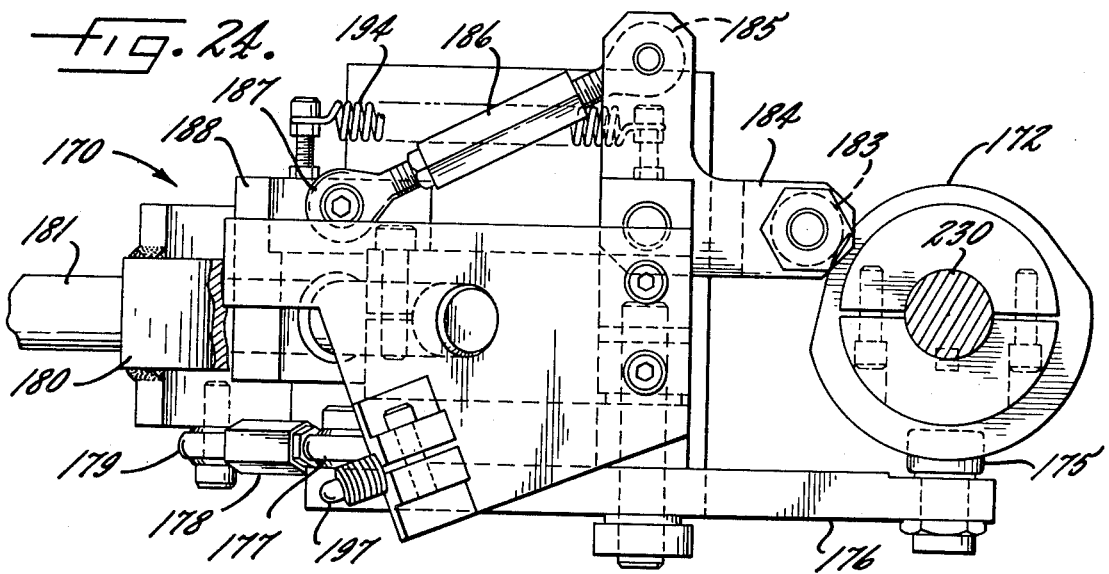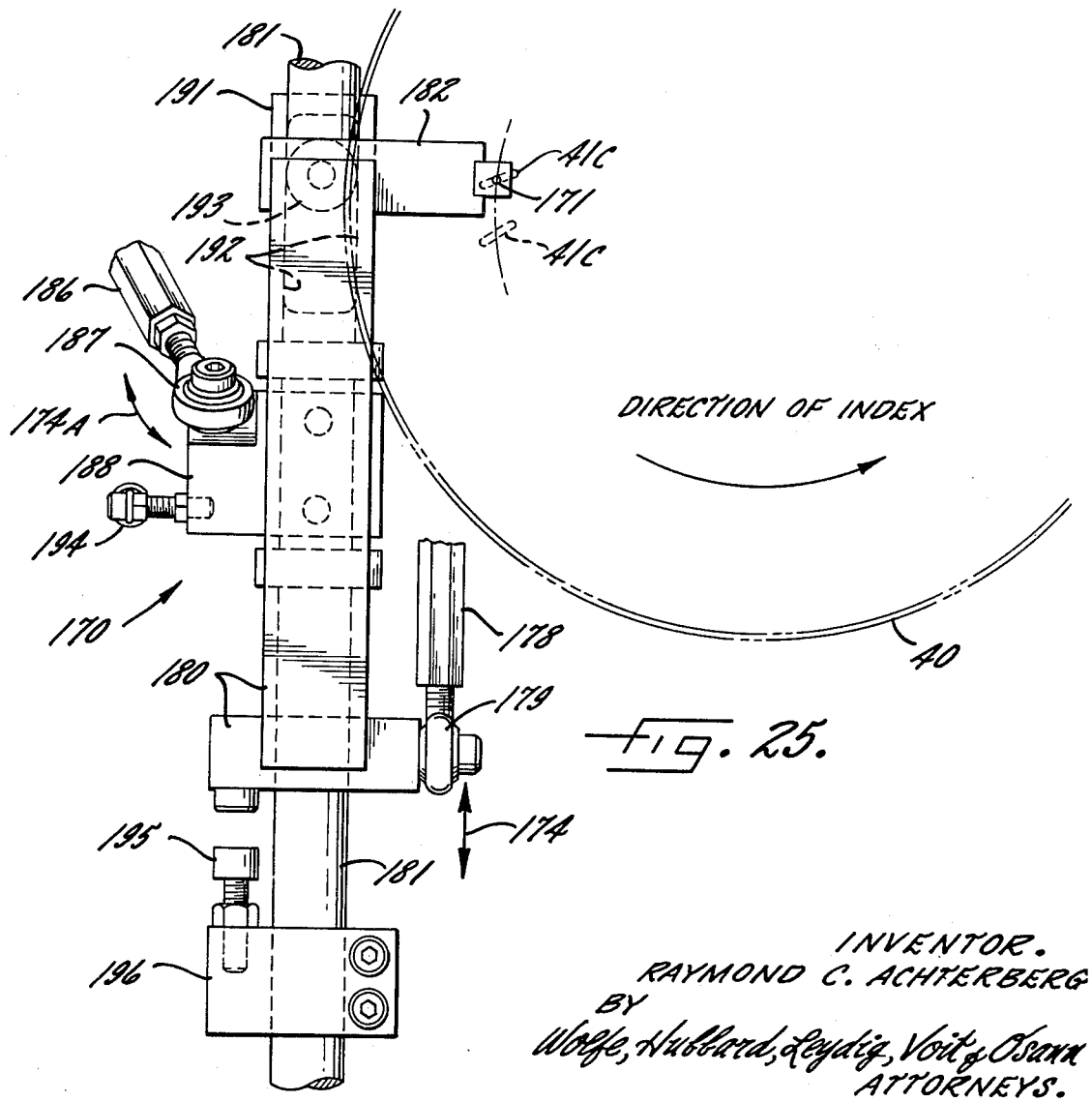

AUTOMATIC INSERT ASSEMBLY SYSTEM EMPLOYING ROTARY TRANSFER OF THE WORKPIECE

BACKGROUND OF THE INVENTION

The present invention relates generally to article assembling apparatus and, more particularly, to an automatic system for transferring and assembling inserts — particularly, curvilinear inserts — in a turbine drum or the like.

Torque convertor assemblies for use in automobile transmissions and like applications have long presented assembly problems for torque convertor manufacturers. Such torque convertors generally include dish-like turbine drums, each resembling the outer half shell of a toroid centrally split in a plane perpendicular to the toroid radii. A ring of turbine blades is secured within this drum for imparting or receiving fluid pressure in response to other parts of the torque convertor. While some such turbines are relatively simply equipped with planar blades located radially or generally radially within the turbine, more complex turbines are provided with blades which may be curved in one, two or three planes and which may be secured within the turbine at nonradial positions.

Assembly of these complex blades, which often number at least 2 dozen blades per drum and which may number 30 or more blades per drum, into the turbine drum has, until now, been a relatively difficult task for torque convertor manufacturers. The complex geometry of the inter-related parts has often required that curvilinear turbine blades be assembled into the curved turbine drum by hand or, alternatively, that the blades be assembled with the assistance of relatively elemental equipment which cannot be operated automatically. Such assembly is, of course, time consuming and expensive.

A particularly difficult assembly problem arises when inserting a turbine blade — particularly a curvilinear blade — into the last unfilled assembly position in the drum, or into an assembly position between two already inserted or assembled blades located in immediately adjacent assembly positions, since relatively small amounts of work space are available for maneuvering the blade and associated assembly tools. The problem may be compounded if blade ears must be inserted into corresponding slots upon the drum, in order to retain the blade in its final assembly position. Such a retention scheme requires that the blade be inserted into the assembled position along a particular approach path of movement. This path of movement provides decreasing tolerance for positional error as the final assembly position is neared by the blade. Thus, the blade-inserting work tools must move precisely along a given path into and out of a confined work space.

It is, therefore, the principal object of this invention to provide a method and associated automatic assembly apparatus for assembling curvilinear workpieces into a support structure at predetermined assembly positions.

It is a related object to provide an automatic method and apparatus for assembling even the last required workpiece or blade into the drum in an assembly position immediately adjacent previously installed blades, and for then extracting the assembling tool without interfering with or jamming against blades previously installed in the turbine drum.

It is yet another object to provide a turbine assembling apparatus which requires a minimum amount of slow or intricate hand work to be performed by the machine operator.

It is still another object to provide a reliable assembling apparatus having synchronized and positively acting assembly mechanisms which will not become misaligned or jammed during machine operation.

It is a further object to provide a turbine assembling apparatus which is reliable and rugged in its design, yet which is low in manufacturing, maintenance and operational costs.

Other objects and advantages of the invention will become apparent upon reading the following detailed description and upon reference to the drawings in which:

FIG. 1 is an overall perspective view showing the assembly machine of the present invention in its general aspect;

FIG. 3 is a fragmentary plan view showing a portion of the turbine drum or similar foil support structure into which some, but not all, of the blade-like inserts have been inserted;

FIG. 4 is a partial sectional view taken substantially along the line 4—4 in FIG. 3, here showing in further detail the relationship between the blade and its mounting ears and the turbine drum;

FIG. 5 is a fragmentary sectional view taken substantially along the line 5—5 in FIG. 4 and showing in further detail the relationship of an outer or first blade ear as it is inserted and located in the turbine drum;

FIG. 6 is a partial sectional view taken substantially along the line 6—6 in FIG. 4 showing the relationship of a third ear of the turbine blade as it is inserted into the turbine drum;

FIG. 7 is a sectional view taken substantially along the line 7—7 in FIG. 2, showing in elevation the turvine drum-holding assembly;

FIG. 8 is a sectional view taken substantially along the line 8—8 in FIG. 7, showing the mandrel nose upon which the drum is mounted;

FIG. 9 is an enlarged sectional view taken substantially along the line 9—9 in FIG. 8, showing the interior of the turbine-holding mandrel;

FIG. 11 is a fragmentary plan view depicting in greater detail a portion of the blade magazine and blade stripper mechanism shown in FIG. 2;

FIG. 12 is a sectional view taken substantially along the line 12—12 in FIG. 11, here illustrating the manner of supporting and guiding the nested stack of blade-like inserts in the blade holding magazine;

FIG. 24 is a sectional view taken substantially along the line 24—24 in FIG. 23, showing in further detail portions of the index finger translating drive;

FIG. 25 is a sectional view taken substantially along the line 25—25 in FIG. 23, here showing in further detail portions of the index finger rotating drive; and, FIG. 26 is a cam chart illustrating the relative timing of the motions of the various cam-actuated drives in the apparatus of the present invention.

While the invention will be described in connection with a preferred embodiment and procedure, it will be understood that it is not intended to limit the invention to that embodiment or procedure; on the contrary, it is intended to cover all alternatives, modifications and equivalents as may be included within the spirit and scope of the invention as expressed in the appended claims.

DESCRIPTION OF THE INVENTION

Figure 2:
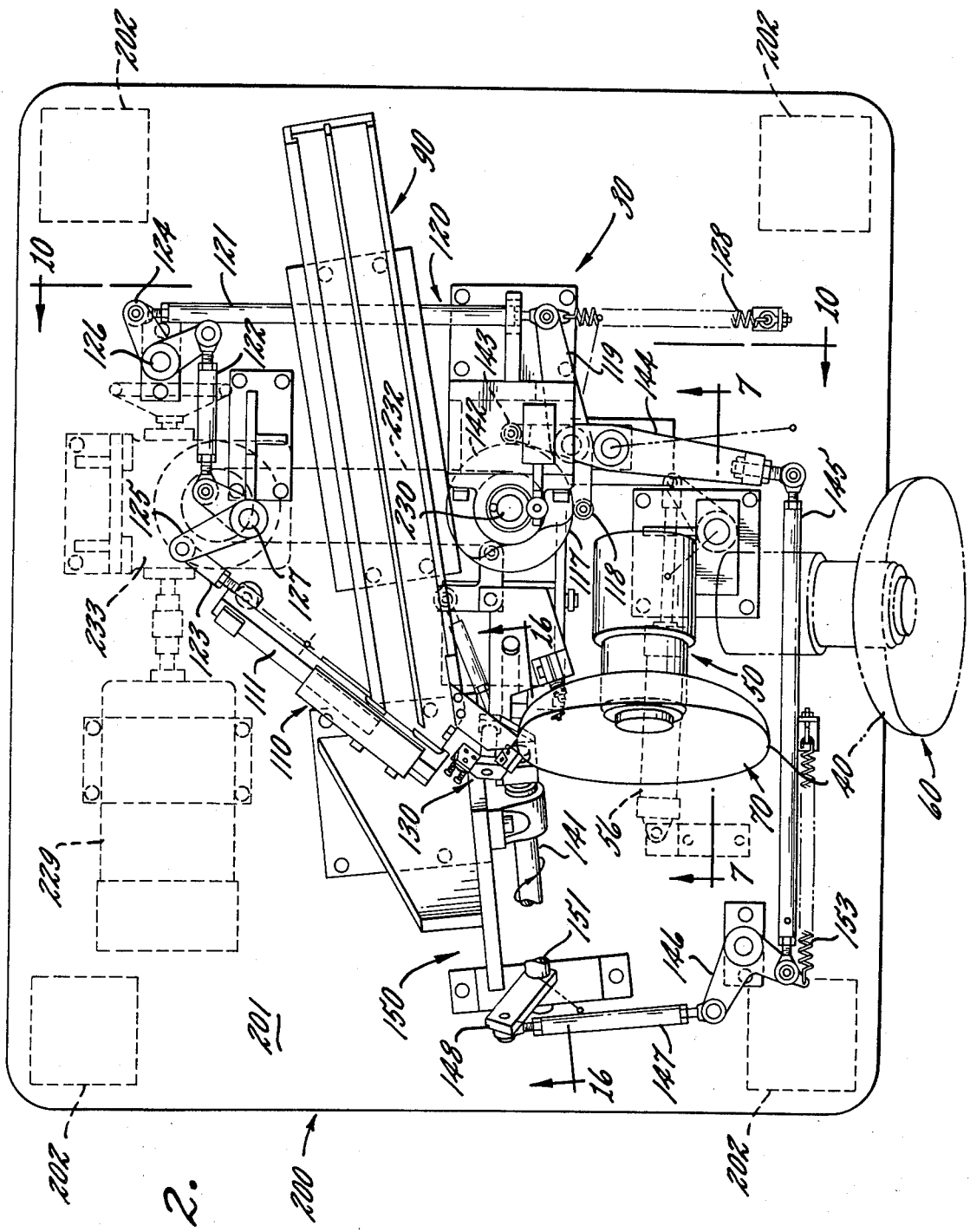
FIG. 2 is an overall plan view of the machine illustrated in FIG. 1.

Turning first to FIGS. 1 and 2, there is depicted an exemplary apparatus, generally indicated at 30, embodying the features of the present invention. In operation, a drum 40 or housing which serves as a support structure for blade-like inserts or fluid foils, is first mounted upon a mandrel assembly, generally indicated at 50, and is then swung from a drum load-unload station, generally indicated at 60 to a work station, generally indicated at 70. The blades 80 are individually stripped from the bottom of a nested stack carried in a magazine 90 by a stripper mechanism, generally indicated at 110, and are inserted into a blade loading clamp 130. A loading mechanism, generally indicated at 150, then moves or rolls the clamped blade 80 into its final assembled position within the drum 40. The loading mechanism 150 is, thereafter, extracted and withdrawn to its former position. After the blade 80 has been inserted into the drum 40, the drum is angularly indexed or rotated about its axis upon the mandrel assembly 50 by an indexing mechanism, generally indicated at 170, so as to position the drum 40 at the next assembly position for receiving the next blade to be loaded. In the illustrated embodiment, the overall function of the apparatus is controlled through a control panel 190, and all the described apparatus is mounted on a frame, generally indicated at 200, comprising a table top 201 of convenient height which may be supported by legs 202.

As the ensuing description proceeds, it will become apparent that the present invention could be utilized to insert many different types of workpieces into many different types of workpiece supports. However, it has been found that the invention finds particularly advantageous, but by no means exclusive, use in inserting blade-like fluid foils — for example, turbine blades —, into an annular, torroidally shaped blade support structure or drum 40.

The blades 80 take the form of curvilinear fluid foils having a general shape comprising slightly more than half of an irregular frusto-conical section as best seen in FIGS. 3–6 and 12. Each blade 80 includes a central portion 81 and two contiguous wing portions 82 and 83. The upper or apicad edge 84 of each blade 80 defines a central channel-shaped opening 85 terminating in two generally opposed notches 86 and 87. The base edge 88 of each blade is shaped to abut the surface of the drum 40 when the blade 80 is installed therein. To insure a firm permanent means for securing each blade 80 within the drum 40, a plurality of mounting ears 89A, 89B, 89C and 89D are formed on the base edge 88 of the blade and are positioned thereon for reception in respective ones of slots 41A, 41B, 41C and 41D formed in the drum 40. As best illustrated in FIG. 1, it will be observed that the slots 41A-41D are disposed in four concentric circular arrays with the outer array having a plurality of equally spaced slots 41A corresponding in number to the number of blades to be mounted in the drum 40, and the three inner arrays respectively having like numbers of equally spaced slots 41B, 41C and 41D.

For holding each blade 80 securely within the drum 40, the ears 89A–89D allow insertion of the foil or blade 80 in the drum and retain the foil therein with a snap fit. To this end, the first or outermost ear 89A is bent outwardly from the plane of wing portion 82 — i.e., away from the axis of the frusto-conical section; the second and fourth ears, 89B and 89D respectively, are formed in the plane of the contiguous portions of the foil 80; while the third ear 89C is bent inwardly from the plane of the contiguous portion of the foil 83 — i.e., toward the axis of the frusto-conical section. The arrangement is such that when the frusto-conically shaped foil is rolled into engagement with the inner surface of the torroidal drum 40, the ears 89A—89D are presented in successive order to respective ones of the slots 41A—41D in the proper orientation to be received therein.

For mounting the drum 40 in an appropriate work position, the mandrel assembly 50 shown in FIGS. 1, 2 and 7-10 is provided. Before commencement of machine operation, the mandrel assembly 50 is located in the load-unload station 60 as best indicated by the phantom lines shown in fig. 2. The machine operator places an empty drum 40 in the illustrated position upon a mandrel chuck 51 (FIG. 9) which is journalled for rotation on a mandrel body 52. For preliminary positioning and retaining the drum 40 upon the chuck 51, the latter is provided with a plurality of detent balls 53 which are normally biased radially outwardly. Thus, when a drum 40 is pressed onto the chuck nose 54 by the machine operator, the detent balls 53 are forced against biasing means (not shown) radially inwardly toward the axis 55 of the mandrel. As the drum 40 is pressed upon the chuck nose 54 into its fully seated position as illustrated in FIG. 9, the detent balls 53 are free to snap back to their former retaining position, thus preliminarily locating the drum 40 upon the mandrel assembly 50.

For permanently locating the drum 40 upon the mandrel assembly 50 for the duration of the work cycle in accordance with one aspect of the invention, a clamping mechanism is energized by a switch (not shown) mounted upon the control panel 190. As can be seen in FIG. 9, a switch initiated actuation of a conventional fluid operated piston/cylinder combination 61 causes an outward movement or extension of a piston rod 62, rod extension 63, connecting collar 64, and cam pin 65. The cam pin 65 is formed with a conical cam surface 66 for engaging a cam follower 67 pivoted upon a drum-grasping jaw 68. Preferably three jaws 68 are mounted at equal angles upon the chuck 51 and are pivoted at 69 upon the chuck so as to be responsive to a radial inward bias force provided by a compression spring 71 (See FIGS. 8 and 9). The outward motion of the cam pin 65 and cam surface 66 (to the left as seen in FIG. 9) will cause the jaws 68 to move radially outwardly in the direction of the arrow 68A into firm engagement with the hub 42 of the drum 40, thus securely clamping the drum upon the mandrell assembly 50.

In carrying out the present invention, provision is made for indexing the clamped drum 40 about the axis 55 of the mandrel assembly 50. To this end, the chuck 51 is secured by bolts 72 to a sleeve 73 which is jornalled upon bearings 74 within the mandrel body 52. In order to permit rotation of the cam pin 65 and the connecting collar 64 with the chuck 51, a journal bearing 75 is positioned between the rotatable collar 64 and the nonrotatable piston rod extension 63.

In keeping with the present invention, provision is made for positively stopping or braking the drum in a desired indexed position following termination of the indexing operation. To accomplish this, a mandrel brake 210 is provided. The arrangement is such that rotation of the mandrel chuck 51 is retarded by a brake shoe 211 which is biased against the mandrel sleeve 73 by a spring 212. The compression of the spring and resultant braking force may be adjusted by a set screw 213 jammed in place by a jam screw 214.

When the drum 40 is secured upon the mandrel 50 by the jaws 68, the mandrel 50 is automatically rotated from its load-unload station 60 to its work station 70. As best seen in FIGS. 7 and 2, a mandrel cylinder 56, is actuated which in turn rotates a mandrel crank arm 56a. A mandrel swing shaft 57 is thus rotated within a sleeve 58; fixed to the top of the mandrel swing shaft 57 is a mandrel mount 59 which carries the mandrel 50.

Accurate location of the mandrel 50 in the work position 70 is insured by a positive stop 220 mounted upon an arm 221 which is fixed to the stationary sleeve 58. A stop lug 222 located upon a depending mandrel mount arm 223 may be threadably adjusted to locate the mandrel 50 in the desired working position 70 along the mandrel swing locus. A second positive stop 224 is provided upon the mandrel swing shaft sleeve 58 to halt rotation of the mandrel 50 as it swings back to the loading position.

A switch 226 is actuated by a cam pin 228 striking an arm 227 as the mandrel mount 59 swings into the work position. The switch 226 energizes a clutch 231 through which a cam shaft 230 is driven by a power means such as an electric motor 229. In the illustrated embodiment, the cam shaft 230 is revolved by a drive train consisting of a clutch 231, belt 232 and speed reducer 233.

As best seen in FIGS. 10—15, the described blades 80 are nested in a magazine 90 for delivery to the magazine stripper 110 and loading clamp 130. The illustrated magazine 90 comprises a series of guide tracks 91, 92 and 93 mounted upon a pedestal 94 for gravity feeding the blades 80 toward the stripper 110. One guide track 93 is designed to engage an outer blade ear 89D while the opposite guide plate 91 engages the correspondingly opposite blade ear 89A. Ends 82 and 83 of the blade 40 are supported upon the magazine floor 95, while the interior channel 85 of the blade 80 is supported by a center guide track 92.

Mounted on the pedestal 94 for reciprocal motion is a slide block 111 carried in guides 112 for motion at an angle of 45° to the blade guides 91-93 of the magazine 90. In accordance with one aspect of the invention and as best seen in FIG. 11, when the slide means 111 moves forward in the direction of the arrows 111A the lowermost blade 80 is abutted at its end 83, stripped from the magazine and forced along the stripper guides. One stripper guide track 113 is formed to guide an outer ear 89A and associated edge of the blade 80; another stripper guide track 114 is formed to guide the notch 86 formed upon the end 82.

The slide block 111 is provided, in the front surface thereof, with a seat or indentation 115 the depth of which is just sufficient to accept the thickness of only the outermost blade 80 for stripping and movement along the stripping guides 113 and 114 to a receiving station at the loading clamp 130. The guide block 116 engages following blades and prevents their motion along the stripper guides 113 and 114 as the first blade is stripped away. As the blade 80 is forced from an original position X to a removed position X', it is clamped into engagement with the loading clamp 130.

Figure 10:
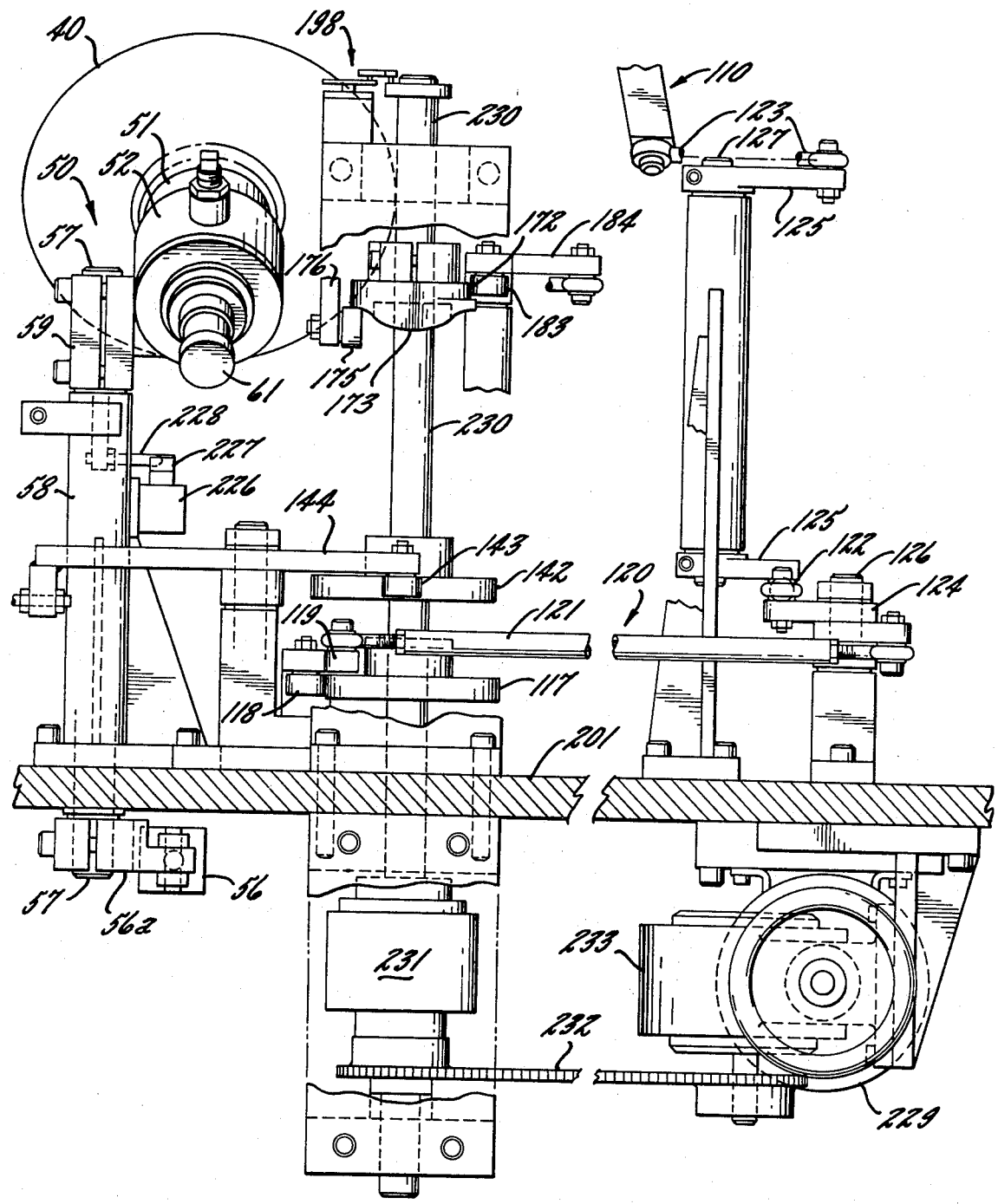
FIG. 10 is an enlarged sectional view taken substantially along the plane of line 10—10 in FIG. 2, showing in further detail the mandrel swinging mechanism and also showing portions of the drive for operating other parts of the apparatus.
Figure 13:
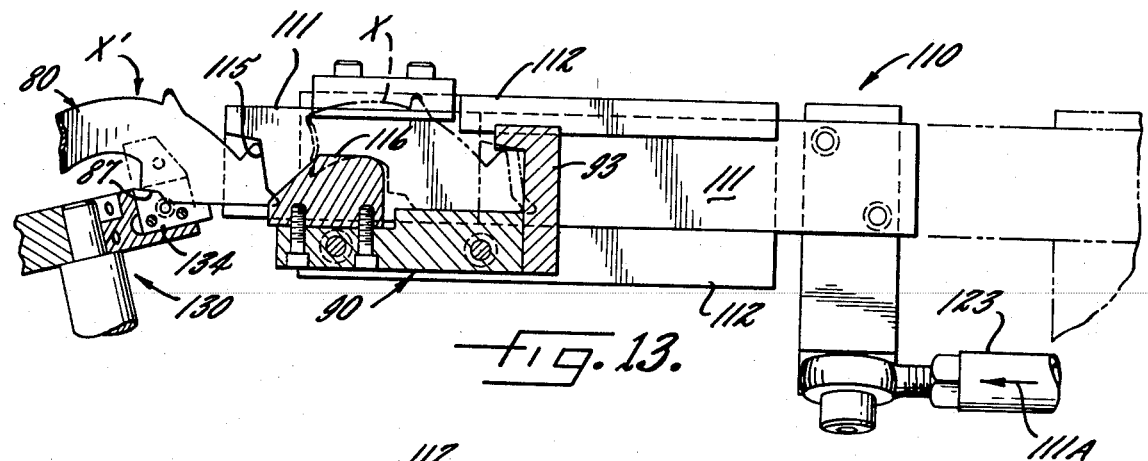
FIG. 13 is a stop action sectional view taken substantially along the line 13—13 in FIG. 11 and showing the blade as it is stripped from the blade magazine and loaded into the load arm clamp mechanism.
Figure 14:
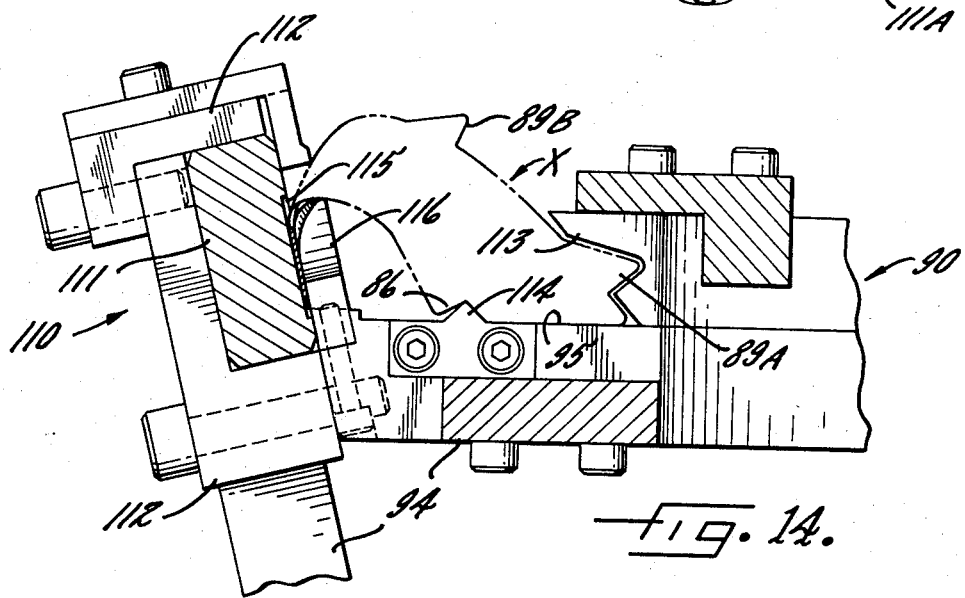
FIG. 14 is a sectional view taken substantially along the line 14—14 in FIG. 11, showing in detail portions of the action of the blade stripping mechanism and the insertion of a blade into the blade load arm clamp.
Figure 15:
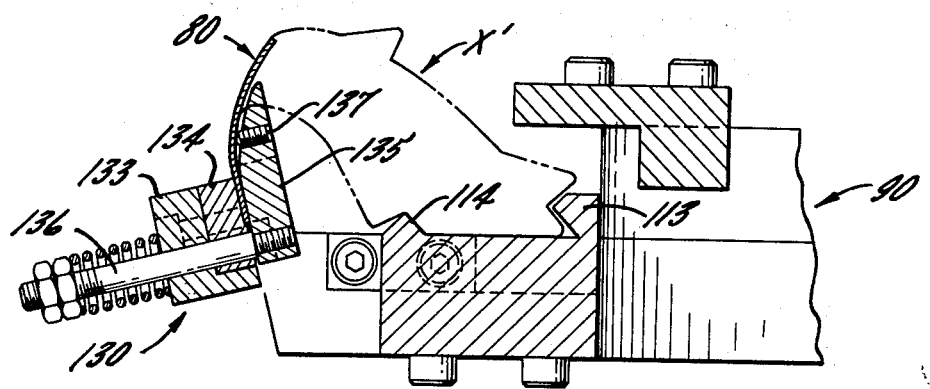
FIG. 15 is a sectional view taken substantially along the line 15—15 in FIg. 11, showing in further detail portions of the blade load clamp and a typical turbine blade loaded therein.
Figure 16:
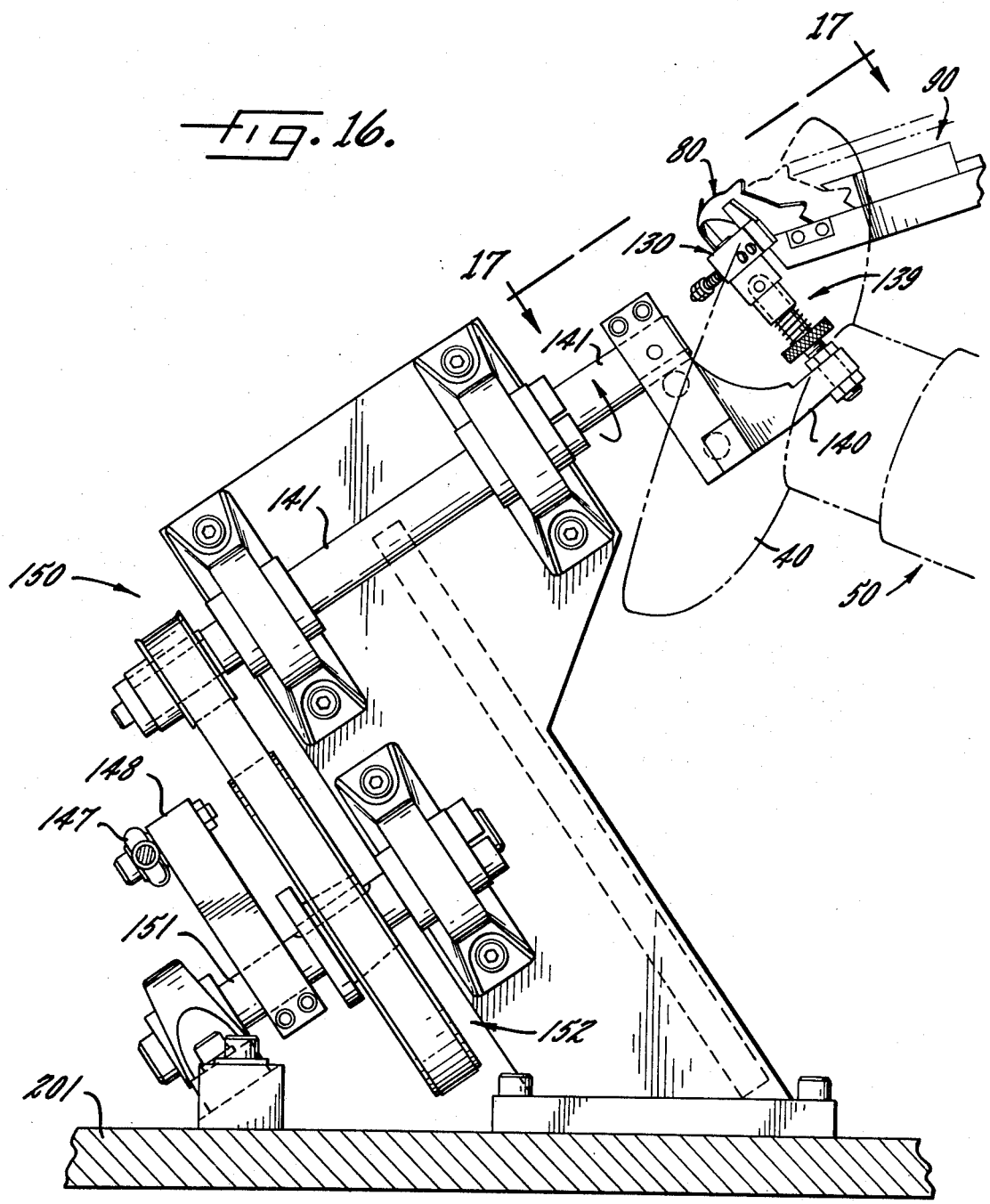
FIG. 16 is a sectional view taken substantially along the line 16—16 in FIG. 2, showing in detail portions of the blade load arm drive mechanism.

In accordance with yet another aspect of the invention, the reciprocal motion of the slide block 111 is synchronized with the motion of other parts of the assembler. As illustrated in FIGS. 1, 2, 10 and elsewhere, the synchronous stripper slide motion is caused by the cam shaft 230 which carries a stripper cam 117. A follower 118 mounted upon a rocker arm 119 causes oscillatory motion in the arm 119. This motion is transmitted through the stripper cam linkage 120, here comprising connecting links 121, 122 and 123, bell cranks 124 and 125, and rock shafts 126 and 127. For tensioning the stripper actuating linkage 120 and taking up the slack or "play" therein, a tensioning spring 128 is provided (FIG. 2). The spring also urges the cam follower 118 into continuous contact with the cam 117 under normal operating conditions.

Figure 17:
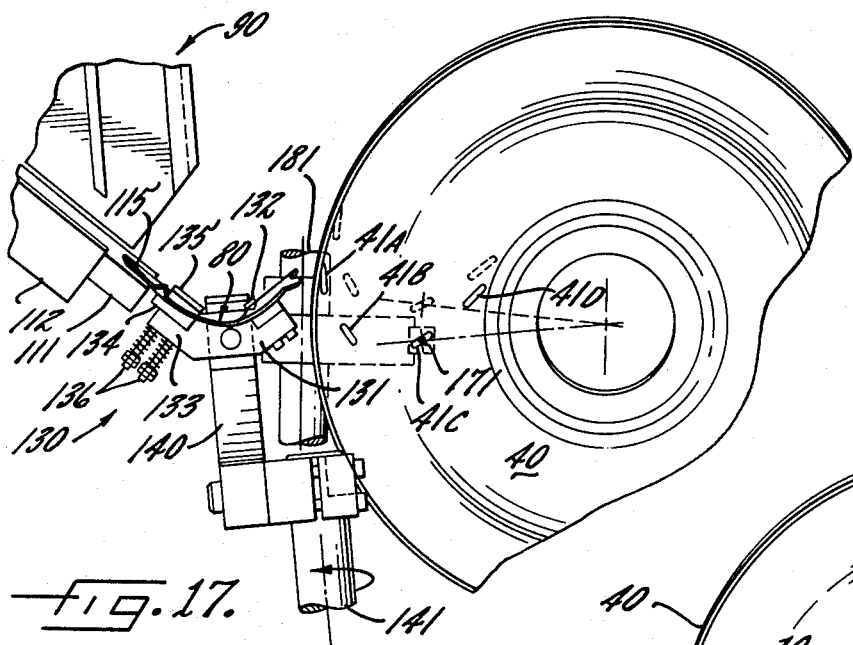
FIG. 17 is a developed view taken substantially along the line 17—17 in Fig. 16, showing the blade as it is loaded into the blade load arm.
Figure 18:
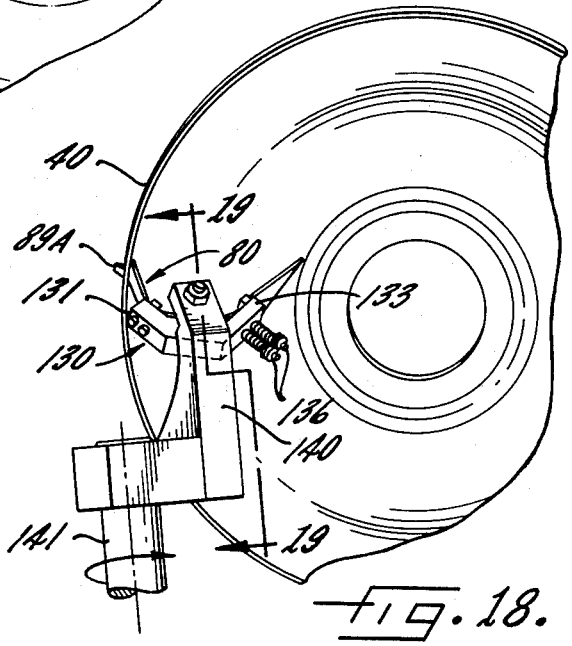
FIG. 18 is a developed view similar to FIG. 17, but here illustrating the blade and blade load arm during the final stages of blade insertion into the drum.

As the blade 80 is moved down the stripper track 113 and 114 by the slide 111, it is forced into engagement with the loading clamp 130. As seen in FIG. 17, this loading clamp 130 is, in its general aspect, curved to receive the angled or conical blade 80. To engage and support the notch 86 of the blade a support end 131 of the loading clamp 130 is provided with an embossment 132. This embossment is so located and formed as to be an extension of the stripper track 114 so that the notch 87 may be easily engaged. The opposite or clamping end 133 of the loading clamp 130 is provided with positive gripper means including a fixed locating block 134 for receiving the blade, and a clamp 135 which is biased, as by spring loaded pins 136 so as to frictionally grip the blade 80 between the clamp 135 and the locating block 134. An adjustable guide pin 137 is provided in the clamp for positioning the clamped blade 80 in the clamp 130 so that the blade may be properly held and positioned as it is rolled into the drum 40.

After the blade 80 has been loaded into the loading clamp 130, it is transported to and permanently inserted in the drum 40, in accordance with a further aspect of the invention. For accomplishing this, the clamp 130 is carried, by means of a resilient wrist pin connection 139, upon an offset load arm 140 which is mounted for oscillatory rotational motion upon a load arm shaft 141.

In yet another aspect of the invention, motion of the load arm 140 and blade 80 clamped thereupon is caused, in synchronization with the other parts of the assembler, by a load arm cam 142 mounted upon the cam shaft 230 (See FIG. 1). By means of this cam 142, oscillatory motion is generated in a cam follower 143 and transmitted, by appropriate linkage members 144-147 and crank 148, to the input shaft 151 of a transmission 152. To amplify the relatively small oscillatory motion caused by the cam follower 143 into the requisite large rolling and translational motion required of the clamp 130 and clamped blade 80, the illustrated transmission 152 provides a 1:4 step up rotational motion amplification. A tensioning spring 153 is provided to take up slack or "play" in the linkage 144-148.

Figure 20:
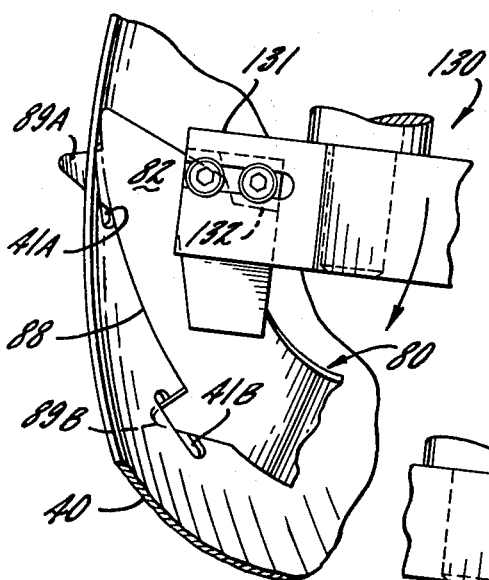
FIG. 20 is a fragmentary stop-action view showing the blade load arm and blade as the first two ears of the blade are inserted into the corresponding slots in the drum.
Figure 21:
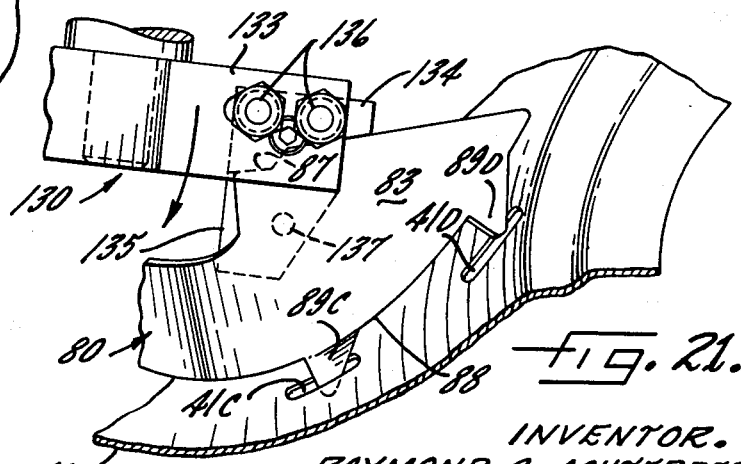
FIG. 21 is a fragmentary stop-action view similar to FIG. 20, but here showing the blade load arm and turbine blade as the last two blade ears are inserted into the turbine drum slots.
Figure 19:
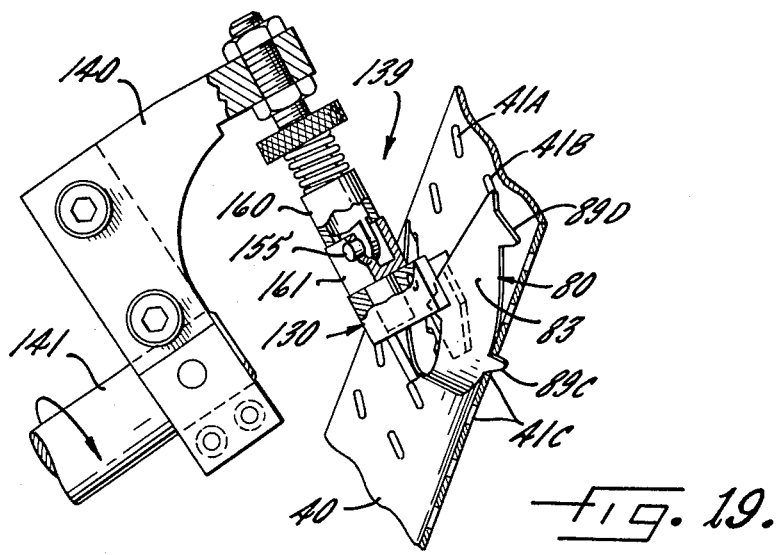
FIG. 19 is a sectional view taken substantially along the line 19—19 in FIG. 18, showing in further detail the mechanism of the blade load clamp.

It is a feature of the invention that the clamped blade 80 is moved by the clamp 130 in a rolling arcuate path so as to invert the blade 80 from its former position and present it for assembly in the drum 40. In the illustrated embodiment of the invention, the ears 89A-89D are thus presented for insertion into corresponding engaging slots 41A-41D formed in the drum 40. To position the blade with increasing precision during assembly, the ears 89A-89D are engaged in the corresponding slots 41A-41D in seriatum order. As the first ear 89A is engaged in its corresponding slot 41A, such engagement provides an additional pivot point for locating and pivoting the blade 80 into its correct position in the drum 40 (See FIG. 20). It is a further feature of the invention that the ear 89A, being formed at a positive angle R to the plane of the immediately adjacent blade surface, is presented perpendicularly or normally to the receiving slot 41A for insertion thereinto as the blade is rolled in the drum 40. The second ear 89B, formed substantially co-planar with the surrounding blade surface, is thereafter inserted into its corresponding slot 41B, as seen in FIG. 21, the third ear 89C, being formed at a substantially negative angle S to the surrounding blade surface, is thereafter cammed into its receiving slot 41C and, in being so inserted, slightly deforms the blade 80 so as to provide a slight pressure upon all the ears, thereby securing the blade within the drum 40 with a snap fit. For securing the end 83 within the drum and for providing further resilient force upon the blade, the ear 89D is inserted into the turbine slot 41D.

After the completed workpiece is removed from the machine, these ears, 89A-89D now protruding through the drum 40 may, if desired, be welded to the drum or peened over, thereby further permanently securing the blades within the drum.

Figure 22:
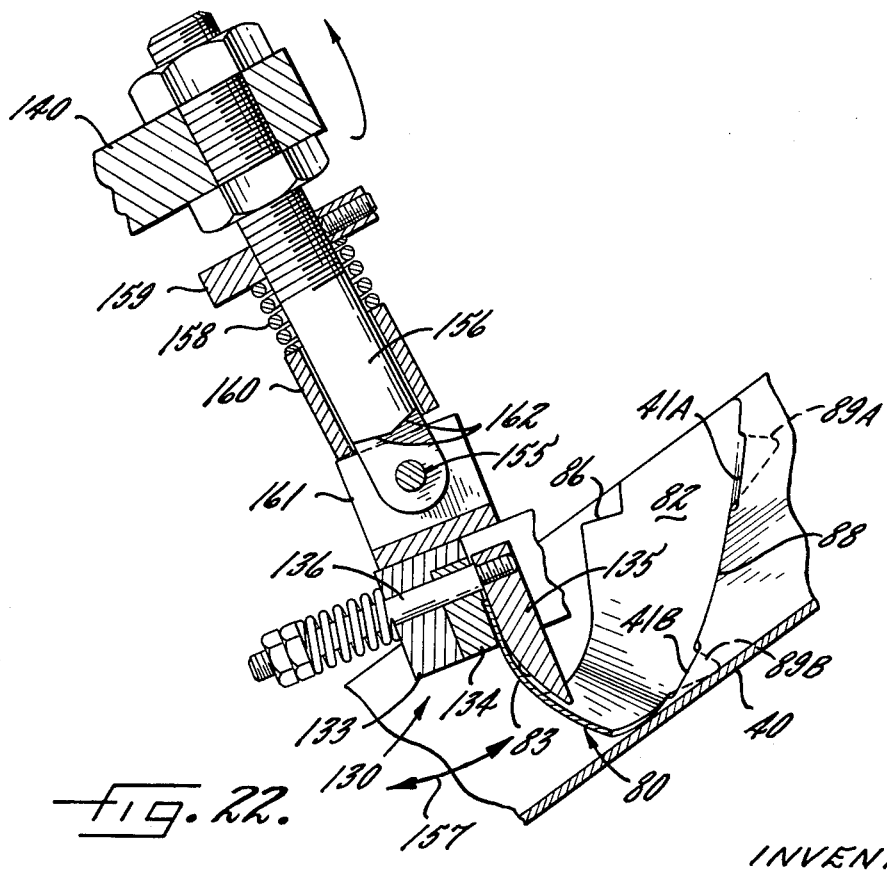
FIG. 22 is a stop-action view showing in further detail the blade load clamp and the wrist action thereof as the clamp is withdrawn from the inserted blade.

Once a blade 80 has been fully inserted into its desired position within the drum 40, the loading clamp 130 is withdrawn by reverse motion of the linkage 143-148. As best seen in FIG. 22, withdrawal of the clamp 130 in the reverse direction tends to drag the clamp block 135 over the notch 87 of the blade 80. To avoid dislodging the now-installed blade 80, the loading clamp 130 is pivoted upon the wrist pin connection 139 so as to allow orientation of the locating block 134 and clamp 135 for easy withdrawal. In carrying out this aspect of the invention, the clamp 130 is pivoted on a pin 155, carried at the end of a spindle 156 for rotational motion in the direction of the arrow 157. Such rotational motion is normally prevented by a biasing means 158 located between an adjustable collar 159 and a wrist pin collar 160. Thus, flexure of the clamp will be resiliently opposed by the spring 158 which urges the wrist pin collar 160 downwardly along the spindle 156 and into engagement with the pivotable portion 161 of the clamp. Positive stop surfaces 162 are formed upon the spindle 156 for engaging the clamp and preventing its excessive rotation.

Figure 23:
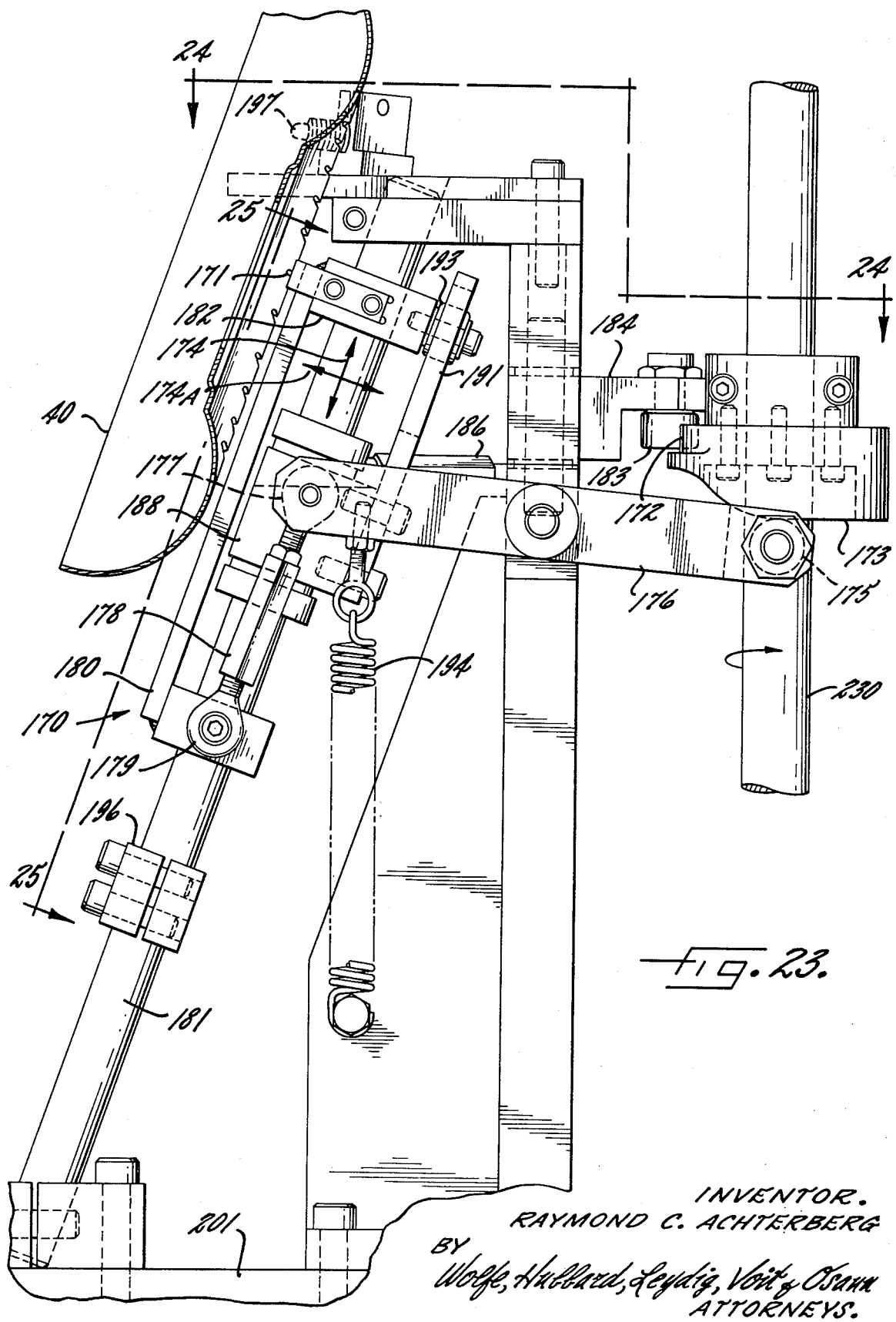
FIG. 23 is a sectional view substantially along the line 23—23 in FIG. 1, showing in detail portions of the drum indexing mechanism.

After a blade 80 has been inserted and fixed within the drum 40 and the clamp 130 withdrawn, the drum is angularly indexed about the axis of the mandrel 50 to a new position so that a succeeding blade may be assembled thereinto. For accomplishing this, the novel drum indexing mechanism best seen in FIGS. 23-25 is provided.

Rotatable indexing the drum 80 in accordance with this aspect of the invention is accomplished by an index pin 171 (See FIG. 25) mounted for insertion into an ear receiving slot 41C formed in the drum. The pin and engaged slot are then pulled downwardly, as seen in FIG. 17, thus rotating the drum 40 to a new blade-insertion position, whereupon the pin 171 is lowered and withdrawn from the drum, and returned in its withdrawn position to the first position at the top of the stroke for reinsertion in the next slot, thus presenting a rectangular locus of index pin travel. This rectangular motion of the pin 171 is generated by a combined edge cam 172 and face cam 173 mounted upon the cam shaft 230 (See FIGS. 10 and 23).

Index pin motion in the directions 174 of translational motion is caused by the face cam 173 and associated follower 175 mounted upon a rock link 176. Motion of the rock link 176 is transmitted through a ball joint 177, connecting rod 178, and ball joint 179 to a bridge 180 journalled for translational and rotational motion upon an inclined mast 181. The index pin 171 is mounted upon an offset arm 182 which is secured to the bridge 180.

The rolling motion of the index pin 171 in the insertion and retraction direction 174A (See FIG. 25) is caused by the edge cam 172 and follower 183. The produced motion is transmitted through a bell crank 184, ball joint 185, connecting rod 186 and ball joint 187 to a journal block 188, mounted for translational and rotational motion upon the mast 181. Rotation of the journal block 188 upon the mast 181 causes a rolling motion to be imparted to a slide lever 191 fixed to the journal block 188. Surfaces 192 on the slide lever are followed by a slide lever follower 193 journalled upon one end of the pin-carrying offset arm 182, thereby rotating the bridge 180 and causing the offset index pin 171 to be rolled into insertion with or retraction from the drum 40. A tension spring 194 takes up slack or "play" in both the rolling linkage and the translational linkage. The mast 181 is spaced from the mandrel 50 sufficiently to allow the drum 40 to clear the bridge 180.

The translational motion of the bridge 180 is limited by an adjustable positive stop 195 fixed to the mast 181. Easy adjustment of the magnitude of translational indexing motion imparted to the drum 40 by the pin 171 carried upon the bridge 180 may be made by appropriate location of the stop collar 196.

To assist in preventing unwanted rotation of the partially loaded drum 40 upon its mounting mandrel, an adjustable stationary finger brake 197 is mounted for engagement with the underside of the drum 40. After retraction of the index pin 171, the drum 40 is held in its indexed position by the finger brake 197 and the mandrel brake 210.

It is a feature of the invention that, should binding or jamming occur in the stripper mechanism 110, loading mechanism 150 or indexing mechanism 170, the respective cam follower will merely be pulled away from its associated cam, thereby preventing damage to the machine, blades or drum.

Figure 26:
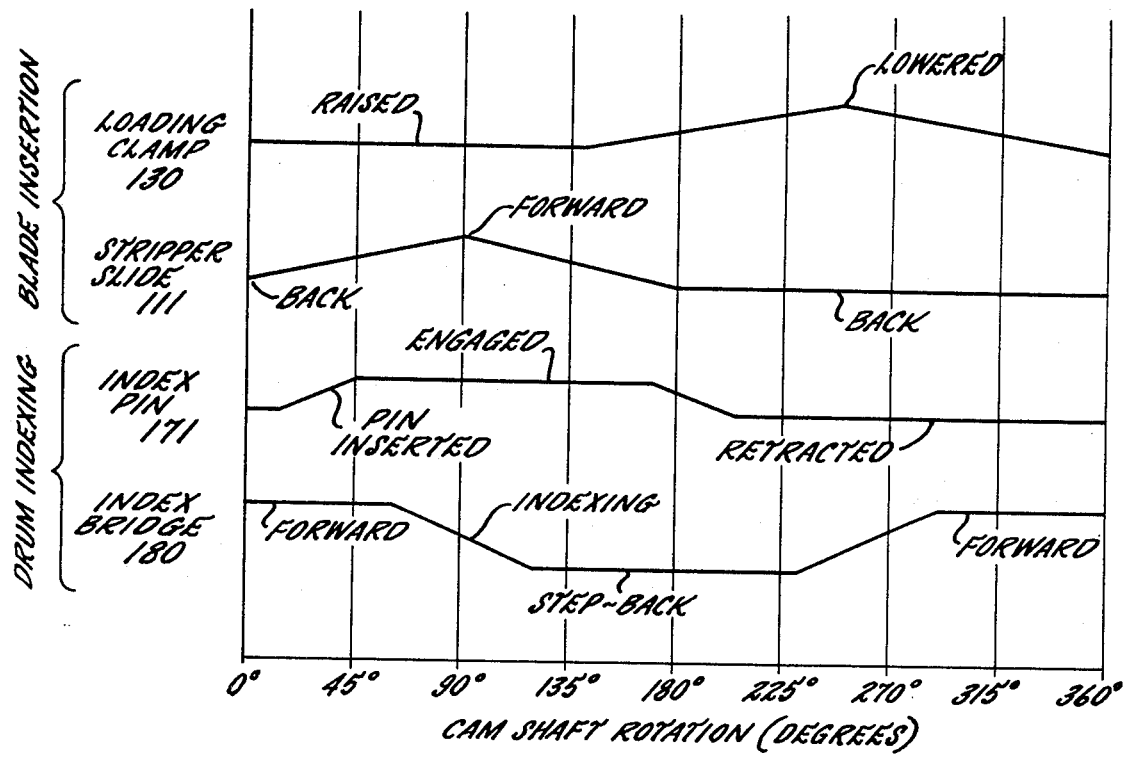

Operation of the assembler during a typical blade insertion cycle may be envisioned by primary reference to the cam chart (FIG. 26) and the overall views of the machine (FIGS. 1 and 2). As the cam shaft 230 rotates, the stripper slide is urged forward, loading a blade into the loading arm clamp. Simultaneously, the drum itself is rotated into position to receive the blade. After approximately 140° of cam shaft rotation, the loading clamp 130 and loaded blade 80 are rolled into the drum 40 by the loading mechanism 150. As the blade 80 is inserted into the drum 40, the index finger 171 is retracted therefrom. Immediately, upon final assembly of the blade 80 into the drum 40, the blade loading clamp 130 is retracted for another cycle. A counter 198 (See FIG. 1) tallies the number of drum index motions and signals, through appropriate electric circuitry located in the control panel 190, that the drum 40 has been indexed through a full rotation and that all necessary blades 80 have been inserted thereinto. Thereafter, the mandrel 50 may be automatically or manually swung back to the load-unload station 60 where the mandrel jaws 68 are withdrawn, the completed workpiece withdrawn from the assembler, and another drum 40 preliminarily positioned upon the mandrel 50.

I claim as my invention:

1. The method of assembling curved workpieces in a curved support structure comprising the steps of:
    A. positioning the support structure in a work station;
    B. stripping a stacked workpiece from a magazine;
    C. inserting the stripped workpiece in a loading clamp;
    D. rolling the clamped workpiece into a predetermined assembled position in the support structure; and,
    E. extracting the loading clamp from the assembled workpiece and support structure.

2. The method as set forth in claim 1 further characterized in that the workpiece is a fluid foil and the support structure is a housing for turbine blades or the like.

3. The method of assembling curved workpieces in a support structure as set forth in claim 1, further including the step of:
    F. angularly indexing the support structure about its axis in the work station from a first to a second assembly position for receiving another workpiece.

4. A method according to claim 3 including the steps of:
    G. rotating the support structure from a load-unload station to a work station for receiving the workpieces;
    H. counting the number of indexing steps performed to determine when the structure has been indexed through a full revolution; and,
    I. returning the structure from the work station to the load-unload station upon completion of one full revolution of indexing steps.

5. A method according to claim 4 including the steps of:
    J. clamping an empty structure upon a rotatable support at a load-unload station before the structure is moved to the work station; and,
    K. unclamping the structure from the rotatable support at the load-unload station after the structure has been indexed through a full revolution at the work station.

6. A method of inserting a curvilinear fluid foil having first and second outer edges and first and second inner edges into a clamping member, including the steps of:
    A. engaging the first outer edge of a foil stacked in a magazine by a stripper member;
    B. stripping the foil from the magazine by moving the stripper at an acute angle to the axis of the magazine; and,
    C. forcing a first inner edge of the foil into clamped engagement with a clamping member,
    D. while simultaneously forcing a point on the foil between the second inner and outer edges into supporting and abutting contact with a supporting portion of the clamping member.

7. A method of inserting fluid foils into a support structure in assembled relationship therewith, comprising the steps of:
    A. supporting a foil at one point upon a loading clamp, the clamp being mounted upon a rotatable arm;
    B. clamping the foil at another point upon the loading clamp;
    C. rolling the clamped and supported foil about the axis of the rotatable arm into a predetermined assembled position in the structure; and,
    D. extracting the loading clamp from the assembled foil and structure.

8. A method according to claim 7 including the step of inserting, in seriatim order, a plurality of ears formed upon the foil into receiving slots formed in the structure.

9. A method according to claim 7 including the step of inverting the foil while simultaneously rolling the foil into its assembled position within the structure.

10. A method according to claim 7 wherein the loading clamp is extracted form the assembled foil and support structure by:
   E. rolling the loading clamp in a direction opposite to that through which the clamp moved during foil insertion; and,
   F. simultaneously pivoting the clamp about a second axis.

11. A method according to claim 10 including the step of:
   G. returning the loading clamp from a pivoted position to a normal position immediately upon termination of contact with the assembled foil by the loading clamp.

12. A method for assembling curved fluid foils in a foil support by means of a synchronously operated stripper slide, a loading clamp, and drum indexing means including an indexing finger, comprising the steps of:
   A. moving the stripper slide in a forward direction from a ready position to a position engaging a foil to shift the foil into a loading clamp disposed in a foil receiving position;
   B. rotating the index finger in a first direction from a retracted first position into a second indexing position located in one of a plurality of slots formed in a common plane of the foil support and generally perpendicular to the vertical axis of the foil support;
   C. linearly translating the index finger a predetermined incremental distance in a second direction in the plane of the slots to rotate the foil support about its vertical axis;
   D. rotating the index finger in a third direction opposite to said first direction to withdraw the finger from the slot in said support and, thereafter, linearly translating the index finger in a fourth direction opposite to said second direction to return the finger to the retracted first position;
   E. rotating the loading clamp about its axis to shift the foil clamped therein from the foil receiving position to a foil loaded position in the foil support; and,
   F. returning the stripper slide and the loading clamp to the ready position and the foil receiving position, respectively.

13. A method according to claim 12 wherein the index finger is caused to momentarily dwell motionlessly before commencing each of the four described motions.

14. A method according to claim 12 wherein the return motions of the stripper slide and the loading clamp commence upon termination of the forward motion of the stripper slide and the foil loading motion of the loading clamp, respectively.

15. A method according to claim 12 wherein steps A through F are repeated cyclically and further including the steps of:
   G. counting the number of cyclic motions completed by the stripper slide, loading clamp and indexing finger; and,
   H. terminating motion of said slide, clamp and finger upon completion of a predetermined number of cycles.

16. Apparatus for assembling curvilinear fluid foils into a foil support structure disposed in a work station, comprising, in combination:
   A. means for supporting said foil support structure in said work station in an initial foil receiving position;
   B. means for supporting a plurality of fluid foils in stacked relation;
   C. stripper means for stripping foils one at a time from said support means;
   D. loading clamp means for receiving each stripped foil one at a time and rolling said foil into a predetermined assembly position within said foil support structure; and,
   E. indexing means for indexing said foil support structure from said initial foil receiving position into a new foil receiving position after each foil has been inserted into said structure.

17. Apparatus according to claim 16 wherein said supporting means includes a rotatable mandrel for supporting said foil support structure in said work station through a full revolution of indexing motion.

18. Apparatus according to claim 17 including a load-unload station and means for shifting said mandrel and said foil support structure between said load-unload station and said work station.

19. Apparatus according to claim 16 including:
   F. power drive means; and,
   G. cam actuating means coupled to said power drive means, stripper means, loading clamp means, and indexing means for synchronously operating said stripper means, loading clamp means and indexing means.

20. Apparatus for assembling fluid foils into an annular foil support having a central opening, said apparatus including:
   A. mandrel means for rotatably supporting the foil support;
   B. said mandrel means including a mandrel body,
   C. a mandrel chuck rotatable with respect to said body,
   D. a plurality of drum-engaging jaws pivotally mounted upon said chuck, and
   E. cam means for urging said jaws radially outwardly into engagement with the annular edge of the foil support central opening.

21. Apparatus according to claim 20 including:
   F. fluid power means for actuating said cam means, said fluid power means being fixed to said mandrel body and said cam means being rotatable with said mandrel chuck.

22. Apparatus according to claim 20, including:
   F. brake means for opposing rotation of said mandrel chuck with respect to said mandrel body.

23. Apparatus according to claim 20, including:
   F. a load-unload station and a work station;
   G. mounting means for supporting said mandrel means for movement between said load-unload station and said work station;
   H. means for shifting said mandrel means between said load-unload station and said work station;
   I. power driven foil assembly means; and
   J. means responsive to the presence of said mandrel at said work position for actuating said power driven foil assembly means.

24. Apparatus for inserting nested curvilinear workpieces into a workpiece support comprising, in combination:
   A. a frame;
   B. means on said frame defining a workpiece receiving station;
   C. means on said frame defining a work station, said work station being spaced from said receiving station;
   D. means on said frame for removably mounting said workpiece support in said work station in a position to receive a workpiece delivered thereto;
   E. means on said frame for storing a plurality of curvilinear workpieces in stacked nested relation;
   F. means for transferring said workpieces one at a time in seriatim order from said storing means to said receiving station; and,
   G. transfer means mounted on said frame for transferring said workpieces from said receiving station to said work station, said transfer means having
      G-1. a clamp for receiving and positively gripping each workpiece delivered to said receiving station and for holding said workpiece in a predetermined oriented position,
      G-2. means for shifting said clamp from a first position in said receiving station to a second position in said work station while simultaneously inverting said clamp and the workpiece retained therein whereby said workpiece is inserted into said support disposed in said work station, and
      G-3. means for releasing said clamp from said inverted workpiece upon insertion of the latter into said support and for returning said clamp to its initial position in said receiving station in readiness to receive and grip the next workpiece delivered thereto.

25. Apparatus as set forth in claim 24 further characterized in that:

D-1. said removable mounting means for said workpiece support includes means for positively clamping said support in successive ones of a plurality of different workpiece receiving positions; and, H. index means are mounted on said frame for selective indexing engagement with said workpiece support in said work station for indexing said support to successive ones of said plurality of different workpiece receiving positions.

26. Apparatus as set forth in claim 25 further characterized in that said workpiece support is annular in shape and is positively clamped by said mounting means with freedom for incremental rotational movement about the axis of said support, and said index means is adapted to intermittently engage said support and, during periods of engagement, to rotate said support through a predetermined angle about the axis of said support.

27. Apparatus as set forth in claim 24 further characterized in that said transfer means includes:

G-4. a transfer arm rotatably mounted on said frame; and,

G-5. means coupled to said arm for causing controlled oscillation thereof about its own axis through a predetermined angle;

G-6. said clamp being mounted on said arm and extending therefrom at an angle offset with respect to the axis of said arm, whereby said clamp is disposed in said workpiece receiving station at one angular limit of oscillation of said arm and in said work station at the other angular limit of oscillation of said arm.

28. Apparatus for inserting fluid foils into a foil support comprising, in combination:

A. a frame;

B. means on said frame for positively locating said foil support in a position oriented to receive foils delivered thereto;

C. means on said frame defining a foil receiving station, said station being spaced from said foil support locating means;

D. a loading arm rotatably mounted on said frame intermediate said station and said foil support locating means;

E. clamp means mounted on said arm and movable in a plane intersecting said station and said foil support, said clamp means E-1. including a clamp adapted to receive and frictionally grip each foil delivered to said station, and E-2. including means for releasing said clamp from said frictionally gripped foil upon intimate engagement of the latter with said foil support; and, F. means coupled to said arm for causing controlled oscillation thereof about its own axis through a predetermined angle whereby said clamp is rotated in a first direction to carry a foil frictionally gripped therein from said station to a position of intimate engagement with said foil support, said clamp is released, and said clamp is rotated in the opposite direction to return said clamp to said station.

29. Apparatus as set forth in claim 28 further characterized in that said frictionally gripped foil is inverted during transit from said station to said foil support.

30. Apparatus as set forth in claim 28 further characterized in that said clamp means includes:

E-3. a wristpin member for connecting said clamp to said loading arm;

E-4. said clamp being pivotally mounted on said wristpin member; and,

E-5. resilient means interposed between said wristpin member and said clamp for biasing said clamp into a predetermined position to insure accurate location of said foil in said foil support while simultaneously permitting flexure of said clamp against said resilient biasing means with respect to said arm so as to preclude disengagement of said foil from said foil support as a result of frictional forces between said foil and said clamp upon withdrawal of said clamp and said arm from the foil inserting position.

31. Apparatus for assembling curvilinear fluid foils into a foil support structure disposed in a work station, comprising, in combination:

A. means for supporting said foil support structure in said work station in an initial foil receiving position;

B. means for supporting a plurality of fluid foils in stacked relation;

C. stripper means for stripping foils one at a time from said support means;

D. loading clamp means for receiving each stripped foil one at a time and rolling said foil into a predetermined assembly position within said foil support structure;

E. indexing means for indexing said foil support structure from said initial foil receiving position into a new foil receiving position after each foil has been inserted into said structure;

F. power drive means;

G. cam actuating means coupled to said power drive means, stripper means, loading clamp means, and indexing means for synchronously operating said stripper means, loading clamp means and indexing means; and H. resilient biasing means coupled to said cam actuating means for allowing said cam actuating means to become disengaged from said power drive means in response to a jammed condition in said stripper means, loading clamp means, and indexing means.

* * * * *